(12) United States Patent
Nakakuki et al.

(10) Patent No.: US 9,949,157 B2
(45) Date of Patent: Apr. 17, 2018

(54) TERMINAL DEVICE AND METHOD FOR USE IN TERMINAL DEVICE

(71) Applicant: Panasonic Intellectual Property Management Co., Ltd., Osaka (JP)

(72) Inventors: Toshio Nakakuki, Kanagawa (JP); Yoshinori Hatayama, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/448,703

(22) Filed: Mar. 3, 2017

(65) Prior Publication Data

US 2017/0289830 A1 Oct. 5, 2017

(30) Foreign Application Priority Data

Mar. 30, 2016 (JP) .................. 2016-067751

(51) Int. Cl.
*H04W 24/00* (2009.01)
*H04W 24/08* (2009.01)
*H04W 64/00* (2009.01)
*H04W 84/12* (2009.01)

(52) U.S. Cl.
CPC ......... *H04W 24/08* (2013.01); *H04W 64/006* (2013.01); *H04W 84/12* (2013.01)

(58) Field of Classification Search
None
See application file for complete search history.

(56) References Cited

U.S. PATENT DOCUMENTS

2002/0021718 A1* 2/2002 Kerhuel ............... H04B 7/2681
370/509
2015/0281023 A1* 10/2015 Funabashi ........... H04L 43/0817
370/242

FOREIGN PATENT DOCUMENTS

EP 692775 A1 1/1996
JP 2015-192396 11/2015

OTHER PUBLICATIONS

The Extended European Search Report dated Jul. 31, 2017 for the related European Patent Application No. 17158269.5.

* cited by examiner

*Primary Examiner* — Alexander Yi
(74) *Attorney, Agent, or Firm* — McDermott Will & Emery LLP (57) ABSTRACT

A receiver receives a first packet signal including first position information indicating a position of a radio device from the radio device. A storage stores a list containing the first position information. An acquirer obtains second position information indicating the position of the terminal device. A determiner determines whether it is possible for the receiver to receive a second packet signal from the radio device based on the second position information and on the first position information contained in the list. An estimator estimates that a reception failure occurs in the receiver if the receiver fails to receive the second packet signal when the determiner determines that it is possible to receive the second packet signal.

4 Claims, 7 Drawing Sheets

| DEVICE ID | FIRST POSITION INFORMATION |
|---|---|
| A1 | B1 |
| A2 | B2 |
| A3 | B3 |
| AZ | BZ |

TERMINAL DEVICE AND METHOD FOR USE IN TERMINAL DEVICE

BACKGROUND

1. Technical Field

The present disclosure relates to communication technology, and more particularly to a terminal device that receives signals including predetermined information.

2. Description of the Related Art

A vehicle can obtain information about the running condition of external vehicles or road situation by means of inter-vehicle or road-to-vehicle communication. In order to check if the transmission function of a communication device installed in the vehicle itself is normally operating or not, the vehicle broadcasts a response request to nearby communication devices. If the vehicle successfully receives a response from a nearby communication device, the vehicle determines that the transmission function of its communication device is normal. When communication devices are present at high density around the vehicle when performing inter-vehicle communication, however, a large number of responses could occur and interfere with the originally intended communication. To address this, a response request can be broadcast only when the number of packets received during a certain period in the past is not more than a predetermined value (see Japanese Unexamined Patent Application Publication No. 2015-192396, for example).

SUMMARY

A test based on response is difficult to implement because response signals are not returned when broadcast transmission is used. It is therefore desired to detect occurrence of a failure in reception functionality even when broadcast transmission is used.

One non-limiting and exemplary embodiment provides a technique for detecting occurrence of a failure in reception functionality.

In one general aspect, the techniques disclosed here feature a terminal device including: a receiver that receives a first packet signal including first position information indicating a position of a first radio device from the first radio device; a storage that stores a list containing the first position information; an acquirer that obtains second position information indicating the position of the terminal device; a determiner that determines whether it is possible for the receiver to receive a second packet signal from the first radio device based on the second position information and on the first position information contained in the list; and an estimator that estimates that a reception failure occurs in the receiver if the receiver fails to receive the second packet signal when the determiner determines that it is possible to receive the second packet signal.

According to the present disclosure, occurrence of a failure in the reception functionality can be detected.

It should be noted that any combination of the above components or conversions of the representation of the present disclosure among method, device, system, recording medium, computer program, or the like are also valid as aspects of the present disclosure.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Before specifically describing the present disclosure, an overview is provided. An embodiment of the present disclosure relates to a communication system that performs inter-vehicle communication between terminal devices mounted on vehicles as well as road-to-vehicle communication from a base station device installed at, for example, an intersection to terminal devices. Such communication systems are also known as intelligent transport systems (ITS). The communication system uses an access control function called carrier sense multiple access with collision avoidance (CSMA/CA), as with a wireless local area network (LAN) compliant with a standard such as IEEE 802.11. Accordingly, the same wireless channel is shared by multiple terminal devices. In ITS, it is necessary to transmit information to an unspecified large number of terminal devices. In order to efficiently carry out such transmission, the present communication system broadcasts packet signals.

More specifically, a terminal device broadcasts a packet signal containing information such as the position, speed, direction of travel, and the like of the vehicle through inter-vehicle communication. Another terminal device receives the packet signal and recognizes the approach of the vehicle or the like based on the information. In order to reduce interference between road-to-vehicle communication and inter-vehicle communication, a base station device repeatedly specifies a frame including multiple subframes. The base station device selects one of the subframes for road-to-vehicle communication and broadcasts a packet signal containing control information and the like during a period in the beginning part of the selected subframe.

The control information includes information on a period in which the base station device broadcasts packet signals (hereinafter referred to as "road-to-vehicle transmission period"). The terminal device determines the road-to-vehicle transmission period based on the control information and broadcasts a packet signal by CSMA during a period other than the road-to-vehicle transmission period (hereinafter referred to as "inter-vehicle transmission period"). Consequently, road-to-vehicle communication and inter-vehicle communication are time-multiplexed. A terminal device that fails to receive the control information from the base station device, that is, a terminal device located outside an area formed by the base station device broadcasts a packet signal by CSMA regardless of frame configuration.

Under such circumstances, the terminal device according to the embodiment of the present disclosure executes driving assistance when assistance triggering conditions are satisfied based on information included in a packet signal received from another terminal device or a base station device. Driving assistance refers to aiding the driver in driving a car, such as assistance for right-turn collision avoidance and assistance for intersection collision avoidance, for example. In assistance for right-turn collision avoidance, the driver is notified of the presence of another car that is traveling in the oncoming direction when turning right. In assistance for intersection collision avoidance, the driver is notified of the presence of any car that is approaching in an intersecting direction when proceeding straight. Although multiple types of driving assistance are specified, publicly known techniques may be employed.

Since in general response signals are not returned in a communication system relying on broadcast transmission, it is difficult to detect occurrence of a failure, for example, a fault, of a terminal device by utilizing transmission and reception of signals. Thus, for detecting occurrence of a failure, received packet signals can be utilized or a loopback test can be performed. In the former approach, the terminal device derives the positional relationship between itself and another terminal device from a message contained in a received packet signal. If the intensity of the received packet signal is low even though the positional relationship indicates proximity of the two, the terminal device determines that it has a fault. However, this approach is not preferable because packet signals would not be received if the reception functionality has a failure. In the latter approach, on the other hand, any failure that occurs outside the loop such as in an antenna would not be detected.

This embodiment carries out the following process in order to detect occurrence of a failure in the reception functionality even in the case of using broadcast transmission. The terminal device makes predictions on reception of a signal from a base station device based on a list indicating position information that shows where the base station device is located and on the position information of the terminal device itself. If no signal is received when a signal is predicted to be received from the base station device, the terminal device estimates that a failure has occurred in the reception functionality.

Figure 1:
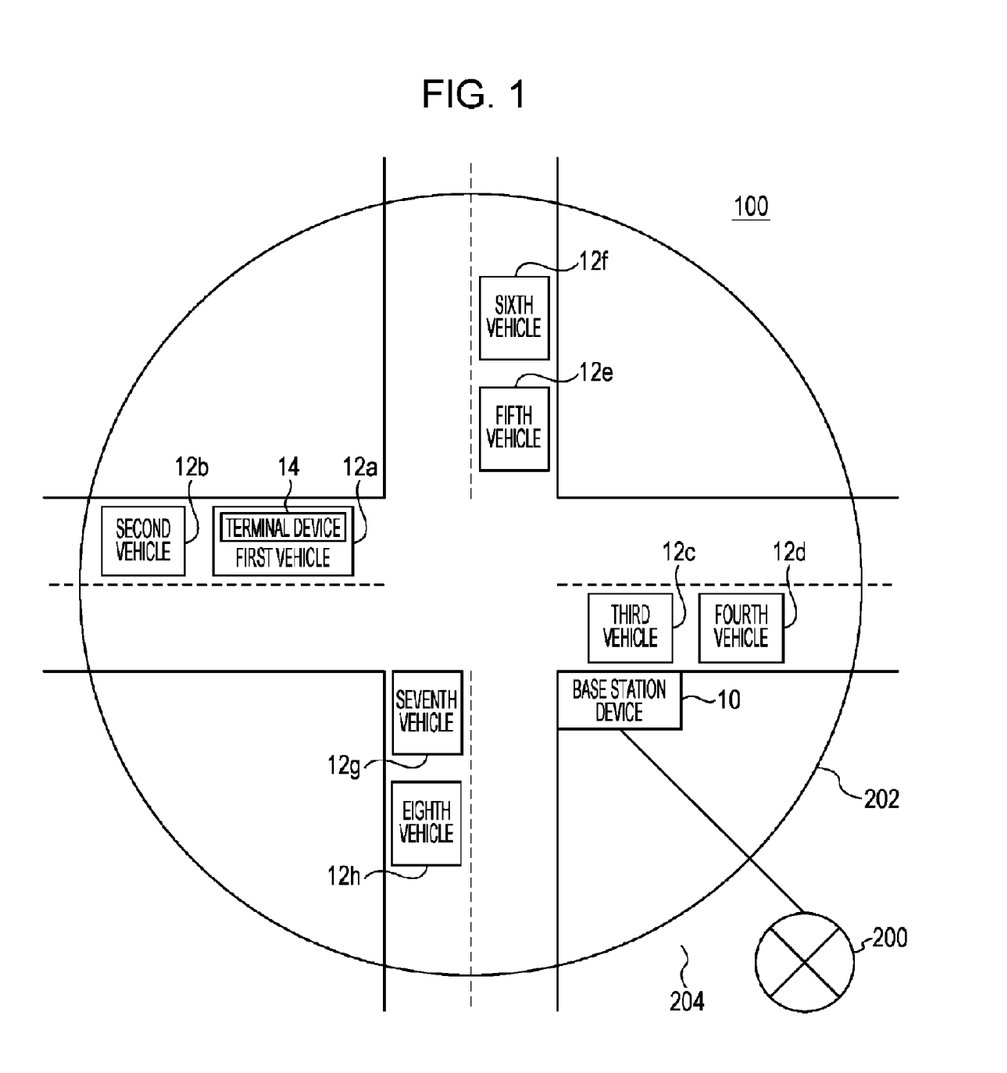
FIG. 1 shows a configuration of a communication system according to an embodiment of the present disclosure.

FIG. 1 shows a configuration of a communication system 100 according to an embodiment of the present disclosure. This diagram represents one intersection as seen from above. The communication system 100 includes a base station device 10, a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are collectively referred to as vehicle 12, and a network 200. A terminal device 14 is mounted on each vehicle 12, although illustrated only in the first vehicle 12a in FIG. 1. An area 202 is defined around the base station device 10, and outside 204 of the area is defined outside the area 202.

As shown in FIG. 1, a road extending in the horizontal direction in the drawing, that is, the left-right direction, and a road extending in the vertical direction in the drawing, that is, the up-down direction, cross in the center. In FIG. 1, the upper, left, lower, and right sides correspond to the directions of north, west, south, and east, respectively. The point at which the two roads cross is the intersection. The first vehicle 12a and the second vehicle 12b are traveling from the left to right side, and the third vehicle 12c and the fourth vehicle 12d are traveling from the right to left side. The fifth vehicle 12e and the sixth vehicle 12f are traveling from the upper side to the lower side, and the seventh vehicle 12g and the eighth vehicle 12h are traveling from the lower side to the upper side. An example of the vehicle 12 is an automobile.

In the communication system 100, the base station device 10 is fixedly installed at the intersection. The base station device 10 controls communication among terminal devices. The base station device 10 repeatedly generates a frame including multiple subframes based on signals received from a global positioning system (GPS) satellite not illustrated or frames generated by other base station device 10 not illustrated. For example, ten frames of 100 msec are generated by dividing a period of one sec indicated in a signal received from a GPS satellite into ten. Specifications have been made to make it possible to set the road-to-vehicle transmission period in the beginning part of each subframe.

From the multiple subframes in a frame, the base station device 10 selects a subframe in which the road-to-vehicle transmission period has not been set by other base station device 10. The base station device 10 sets the road-to-vehicle transmission period in the beginning part of the selected subframe. The base station device 10 broadcasts a packet signal in the road-to-vehicle transmission period that has been set. More than one packet signals could be broadcast in the road-to-vehicle transmission period. A packet signal is formed from control information and payload. The control information includes the subframe number of the subframe in which the road-to-vehicle transmission period is set and the like. The payload includes accident information, congestion information, and signal information, for example. These data are obtained from the network 200.

The terminal device 14 is mounted on the vehicle 12 as mentioned above and thus mobile. Upon receiving a packet signal from the base station device 10, the terminal device 14 estimates that the terminal device 14 is in the area 202. When the terminal device 14 is in the area 202, it generates a frame based on the control information included in the packet signal, particularly information about the timing in which the road-to-vehicle transmission period is set and information about the frame. As a consequence, the frame generated by each of the multiple terminal devices 14 synchronizes with the frame generated by the base station device 10. The terminal device 14 broadcasts the packet signal during the inter-vehicle transmission period, which is a separate period from the road-to-vehicle transmission period. In the inter-vehicle transmission period, CSMA/CA is carried out. When the terminal device 14 estimates that the terminal device 14 is in the outside 204 of the area, it broadcasts the packet signal by carrying out CSMA/CA regardless of the frame configuration. The terminal device 14 recognizes, for example, approach of another vehicle 12 on which another terminal device 14 is mounted based on the packet signal from that terminal device 14.

Figure 2:
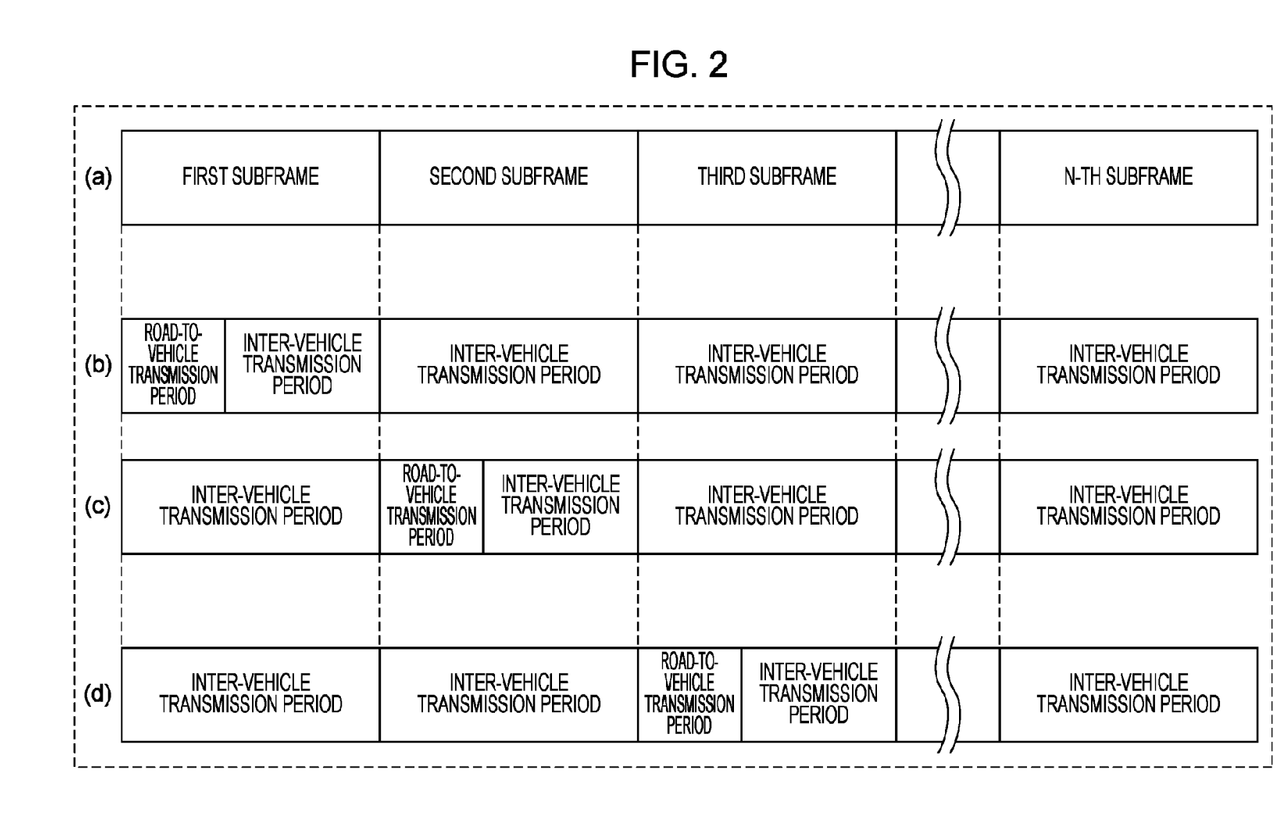
FIG. 2 shows the format of a frame specified in the communication system of FIG. 1.

FIG. 2 shows a format of the frame specified in the communication system 100. FIG. 2(a) shows the frame configuration. The frame is formed of N subframes shown as the first to N-th subframes. In other words, the frame is formed by time-multiplexing of multiple subframes that can be used for broadcast transmission by the terminal device 14. When the frame length is 100 msec and N is 8, for example, a subframe with a length of 12.5 msec is specified. N may be a value other than 8.

FIG. 2(b) shows the configuration of a frame generated by a first base station device 10a not illustrated. The first base station device 10a represents an arbitrary base station device 10. The first base station device 10a sets the road-to-vehicle transmission period in the beginning part of the first subframe. The road-to-vehicle transmission period is a period during which the base station device 10 is able to broadcast a packet signal. The first base station device 10a also sets the inter-vehicle transmission period subsequent to the road-to-vehicle transmission period in the first subframe. The inter-vehicle transmission period is a period during which the terminal device 14 is able to broadcast a packet signal. That is, specifications are made so that the first base station device 10a can broadcast a packet signal in the road-to-vehicle transmission period, which is the beginning period of the first subframe, and the terminal device 14 can broadcast a packet signal in the inter-vehicle transmission periods excluding the road-to-vehicle transmission period within the frame. The first base station device 10a further sets only the inter-vehicle transmission period in the second through N-th subframes.

FIG. 2(c) shows the configuration of a frame generated by a second base station device 10b not illustrated. The second base station device 10b sets the road-to-vehicle transmission period in the beginning part of the second subframe. The second base station device 10b also sets the inter-vehicle transmission period in the second subframe subsequent to the road-to-vehicle transmission period, in the first subframe, and in the third to N-th subframes. FIG. 2(d) shows the configuration of a frame generated by a third base station device 10c not illustrated. The third base station device 10c sets the road-to-vehicle transmission period in the beginning part of the third subframe. The third base station device 10c also sets the inter-vehicle transmission period in the third subframe subsequent to the road-to-vehicle transmission period, in the first and second subframes, and in the fourth to N-th subframes. In this manner, the multiple base station devices 10 select different subframes from each other and set the road-to-vehicle transmission period in the beginning part of the selected subframe.

Figure 3:
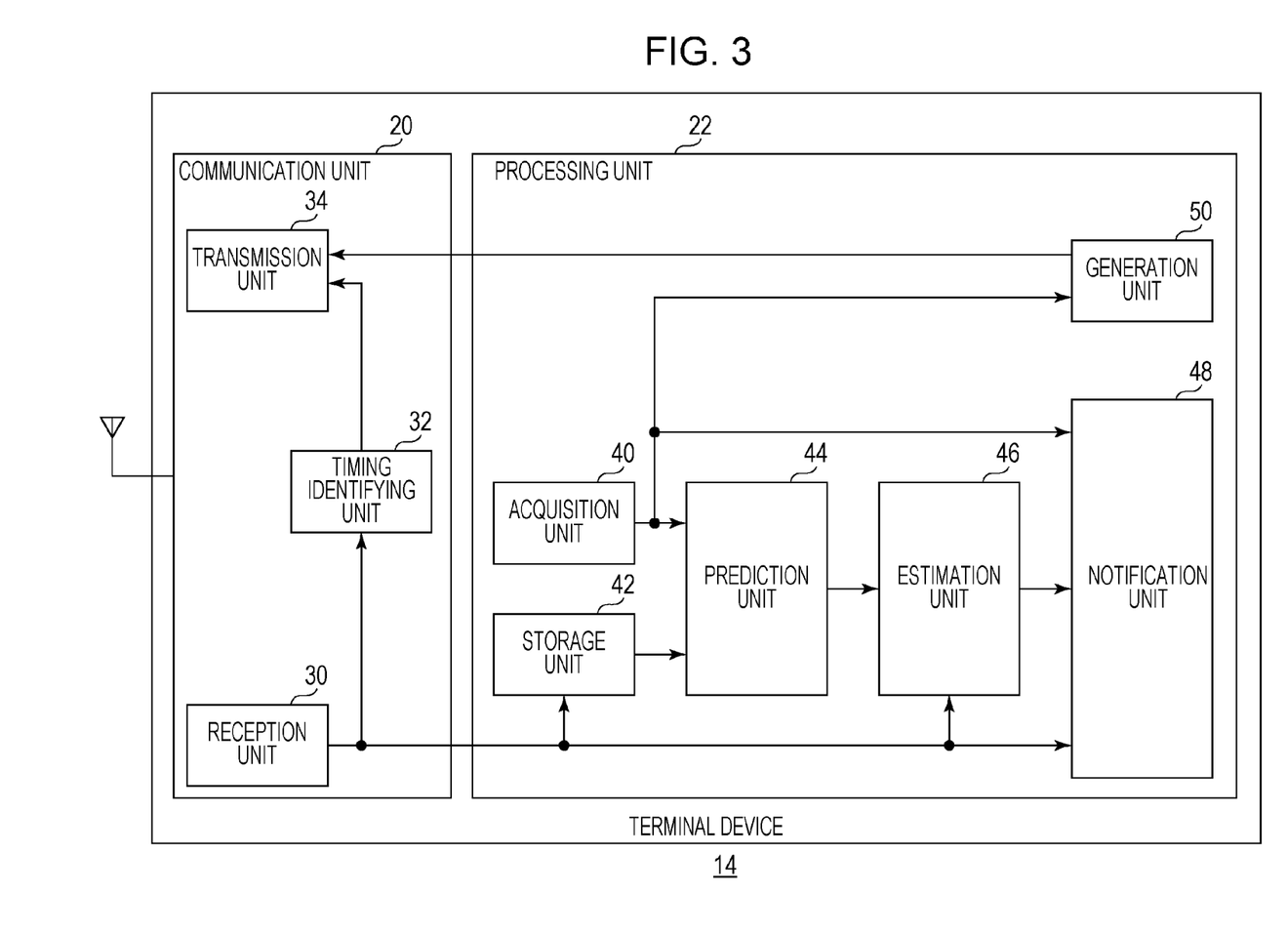
FIG. 3 shows a configuration of the terminal device of FIG. 1.

FIG. 3 shows a configuration of the terminal device 14. The terminal device 14 includes a communication unit 20 and a processing unit 22. The communication unit 20 includes a reception unit 30, a timing identifying unit 32, and a transmission unit 34. The processing unit 22 includes an acquisition unit 40, a storage unit 42, a prediction unit 44, an estimation unit 46, a notification unit 48, and a generation unit 50. The terminal device 14 is mountable on the vehicle 12 as mentioned earlier.

The reception unit 30 receives packet signals from other terminal devices 14 not illustrated or from the base station device 10 via an antenna. The reception unit 30 performs frequency conversion on a received packet signal of a radio frequency to generate a baseband packet signal. The reception unit 30 also performs demodulation on the baseband packet signal. As the communication system 100 supports the orthogonal frequency division multiplexing (OFDM) modulation scheme, the reception unit 30 also carries out fast Fourier transform (FFT). The reception unit 30 outputs the result of demodulation to the processing unit 22 and the timing identifying unit 32.

The timing identifying unit 32 identifies the timing in the subframes at which the road-to-vehicle transmission period is located when the result of demodulation from the reception unit 30 indicates a packet signal from a base station device 10 not illustrated. In identifying the timing, the timing identifying unit 32 estimates that the terminal device 14 is in the area 202 of FIG. 1. The timing identifying unit 32 generates a frame synchronized with the frame that was generated at the base station device 10 based on information included in the packet signal from the base station device 10. When a packet signal from a base station device 10 has not been input, the timing identifying unit 32 estimates that the terminal device 14 is in the outside 204 of the area in FIG. 1.

When the timing identifying unit 32 estimates that the terminal device 14 is in the area 202, the timing identifying unit 32 selects the inter-vehicle transmission period. The timing identifying unit 32 also determines the transmission timing by starting CSMA/CA during the inter-vehicle transmission period. When the timing identifying unit 32 estimates that the terminal device 14 is in the outside 204 of the area, the timing identifying unit 32 determines the transmission timing by carrying out CSMA/CA without consideration of the frame configuration. The timing identifying unit 32 notifies the transmission unit 34 of the transmission timing determined.

The transmission unit 34 performs modulation on data from the processing unit 22. As the communication system 100 supports the OFDM modulation scheme as noted above, the transmission unit 34 performs inverse fast Fourier transform (IFFT) as well. The transmission unit 34 also performs frequency conversion on the resulting baseband packet signal to generate a packet signal of a radio frequency. The transmission unit 34 then broadcasts the packet signal of the radio frequency from an antenna at the transmission timing indicated by the timing identifying unit 32.

The reception unit 30 outputs the result of demodulation as mentioned above. The result of demodulation includes the position, direction of travel, travel speed, and the like of another vehicle 12 (hereinafter collectively referred to as "first position information") transmitted from another terminal device 14 mounted on that vehicle 12. The result of demodulation possibly includes the first position information for a base station device 10 transmitted from the base station device 10. The result of demodulation further includes identifying information for identifying the source of the signal either as a base station device 10 or a terminal device 14. The terminal device 14 and the base station device 10 are collectively referred to as "radio devices". The first position information and the identifying information are input to the storage unit 42, the estimation unit 46, and the notification unit 48.

The acquisition unit 40 obtains the position, direction of travel, travel speed, or the like of the vehicle 12 on which this terminal device 14 is mounted (hereinafter also referred to as "this vehicle 12") (hereinafter collectively referred to as "second position information") from data supplied by a GPS receiver, a gyroscope, a speed sensor, and the like, not illustrated, included in the acquisition unit 40. The position is indicated by a latitude and a longitude. The direction of travel is indicated by an azimuth that is measured with the north as reference azimuth (zero degrees) and with clockwise angle represented as positive. Such measurements may be obtained using publicly known techniques and thus description on them is omitted herein. The acquisition unit 40 outputs the second position information to the prediction unit 44, the notification unit 48, and the generation unit 50.

The notification unit 48 receives the first position information and identifying information input from the reception unit 30 and the second position information input from the acquisition unit 40. The notification unit 48 decides to execute assistance if these input information satisfy assistance triggering conditions. The assistance triggering conditions are determined for each type of driving assistance. For example, the assistance triggering conditions for right-turn collision avoidance assistance may be defined as that (i) the speed of this vehicle 12 is below a predetermined speed, (ii) the right indicator of this vehicle 12 is on, (iii) the positional relationship between this vehicle 12 and another vehicle 12 is passing, and (iv) this vehicle 12 and the other vehicle 12 are to encounter within a predetermined time. The assistance triggering conditions for intersection collision avoidance assistance may be defined as that (i) the positional relationship between this vehicle 12 and another vehicle 12 is crossing, and (ii) this vehicle 12 and the other vehicle 12 are to encounter within a predetermined time. If the notification unit 48 decides to execute assistance, the notification unit 48 issues an alert. The alert is issued via at least one of a screen and sound.

The generation unit 50 receives the second position information input from the acquisition unit 40. The generation unit 50 generates a packet signal that includes the second position information. The packet signal also contains identifying information for the terminal device 14. The generation unit 50 outputs the packet signal to the transmission unit 34. In the following, a process for estimating occurrence of a failure in the reception functionality of the terminal device 14, which performs the above-described processing, will be described.

Figure 4:
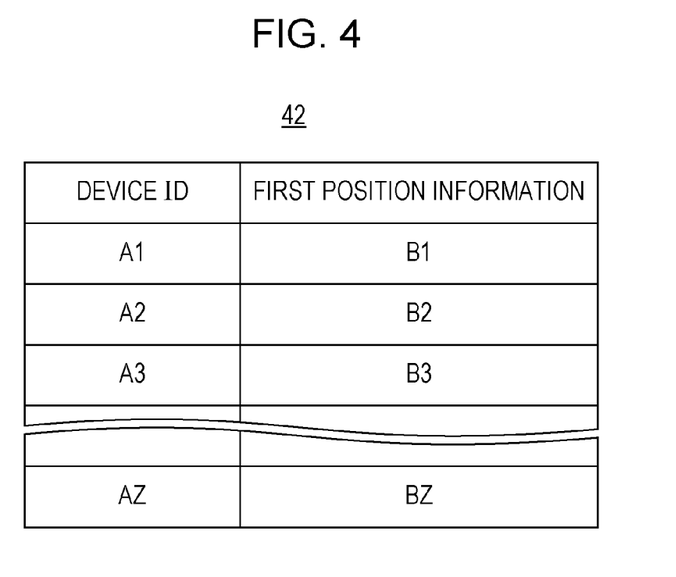
FIG. 4 shows the data structure of a list stored in the storage unit of FIG. 3.

The storage unit 42 receives the first position information and identifying information input from the reception unit 30. If the identifying information indicates the base station device 10, the first position information corresponding to the identifying information is registered in a list. This is equivalent to storing the first position information that was included in a packet signal previously received by the reception unit 30 as a list. FIG. 4 shows a data structure of the list stored in the storage unit 42. As shown in FIG. 4, a device ID and the first position information are stored in association with each other. The device ID is an ID assigned to the base station device 10 as sender and input in conjunction with the first position information. Referring back to FIG. 3, if the input first position information is already registered, the storage unit 42 may omit the registration of the first position information.

The prediction unit 44 receives the second position information input from the acquisition unit 40. The prediction unit 44 calculates the distance between the position indicated by the input second position information and the position indicated by each piece of first position information contained in the list stored in the storage unit 42. If there is any distance that is smaller than a threshold, the prediction unit 44 predicts that a packet signal will be received from a base station device 10. The threshold is set to a distance equal to or shorter than the distance over which a packet signal from a base station device 10 can be received. That is, the prediction unit 44 predicts that a packet signal will be received from a base station device 10 by the reception unit 30 when the distance between any piece of first position information contained in the list stored in the storage unit 42 and the second position information obtained by the acquisition unit 40 is smaller than the threshold. When a packet signal is predicted to be received from a base station device 10, the prediction unit 44 provides a report on the expected reception to the estimation unit 46.

The estimation unit 46 receives the report on the expected reception input from the prediction unit 44. The estimation unit 46 estimates that the reception unit 30 is normally operating if the first position information is input from the reception unit 30, that is, if the reception unit 30 receives a packet signal, when an expected reception has been input. However, if the first position information is not input from the reception unit 30, that is, if the reception unit 30 does not receive a packet signal when an expected reception has been input, the estimation unit 46 estimates that a reception failure has occurred in the reception unit 30 (a fault of the reception unit 30). The estimation unit 46 may also estimate that a reception failure has occurred in the reception unit 30 if the reception unit 30 has received a packet signal but the reception power of the received packet signal is lower than a predetermined value. When the estimation unit 46 estimates that a reception failure has occurred, it provides a report on occurrence of a reception failure to the notification unit 48.

Figure 5A:
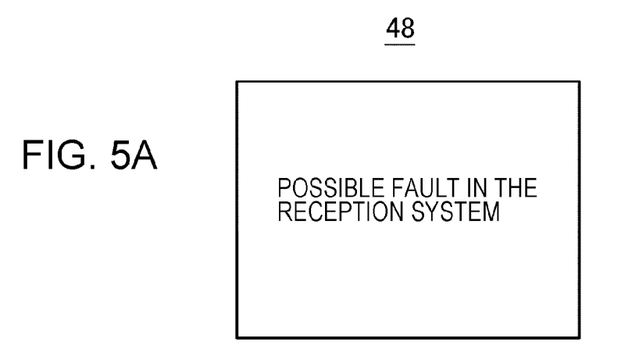
FIG. 5A illustrates a screen displayed by the notification unit of FIG. 3.
Figure 5B:
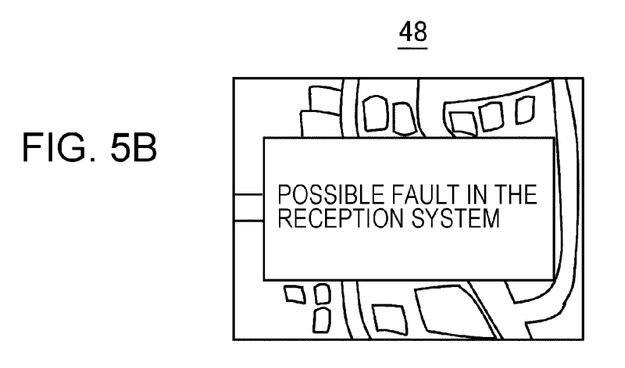
FIG. 5B illustrates a screen displayed by the notification unit of FIG. 3.
Figure 5C:
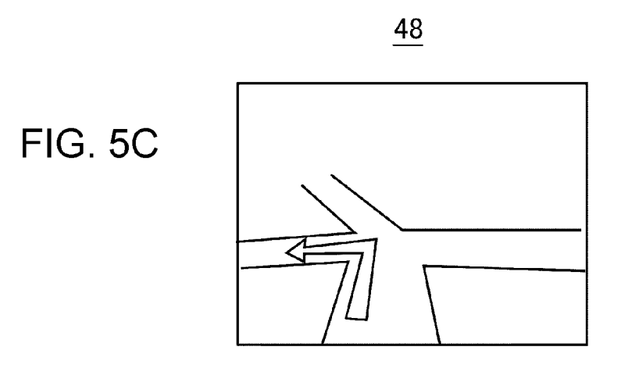
FIG. 5C illustrates a screen displayed by the notification unit of FIG. 3.

The notification unit 48 receives the report on occurrence of a reception failure input from the estimation unit 46. The notification unit 48 displays a screen indicating the occurrence of a reception failure on a monitor. FIGS. 5A, 5B, and 5C show screens that may be displayed by the notification unit 48. FIG. 5A illustrates a case of displaying a reception failure occurrence message. FIG. 5B illustrates a case of displaying a reception failure occurrence message over a navigation screen. FIG. 5C illustrates a case of displaying route guidance that encourages the driver to move toward another base station device 10 (the position indicated by another piece of first position information) included in the list stored in the storage unit 42 in order to execute the processing by the estimation unit 46 again by reattempting the reception of a packet signal from a base station device 10.

This configuration can be implemented with a CPU, memories, or other LSIs of a desired computer in terms of hardware, or with a program loaded into memory in terms of software, though functional blocks implemented by cooperation of them are illustrated herein. It is therefore understood by those skilled in the art that such functional blocks may be implemented in various forms with hardware alone or combination of hardware and software.

Figure 6:
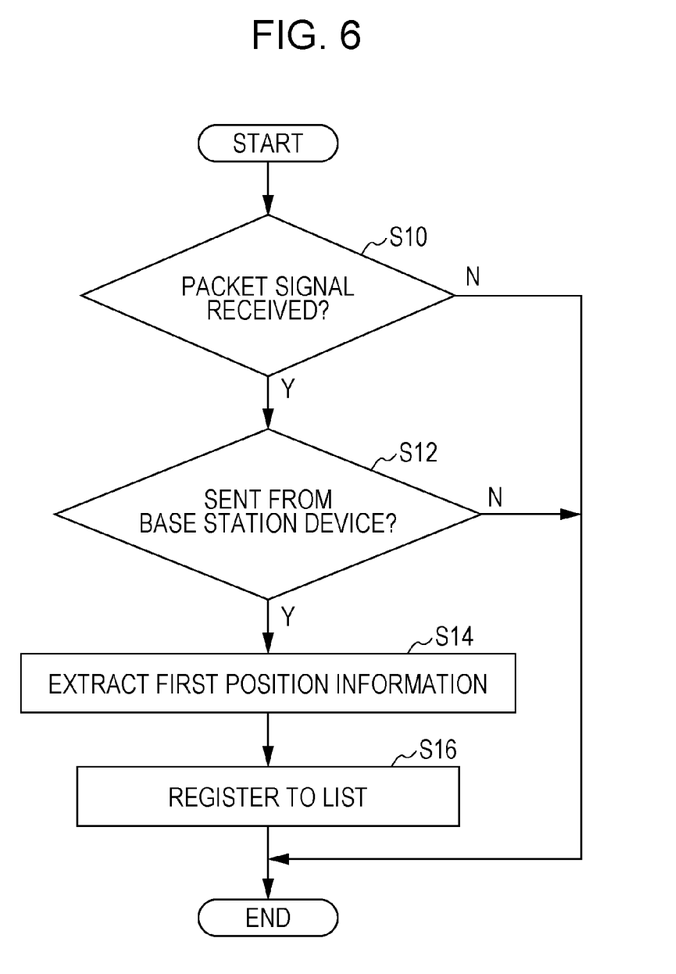
FIG. 6 is a flowchart illustrating a procedure for generating a list performed by the terminal device of FIG. 3.

The operation of the communication system 100 configured as described above will be now described. FIG. 6 is a flowchart illustrating a procedure for generating a list performed by the terminal device 14. When the reception unit 30 receives a packet signal (Y at S10) and if the packet signal was sent by a base station device 10 (Y at S12), the storage unit 42 extracts the first position information (S14) and registers the first position information in the list (S16). If the reception unit 30 does not receive a packet signal (N at S10) or if the packet signal was not sent by a base station device 10 (N at S12), the process ends.

Figure 7:
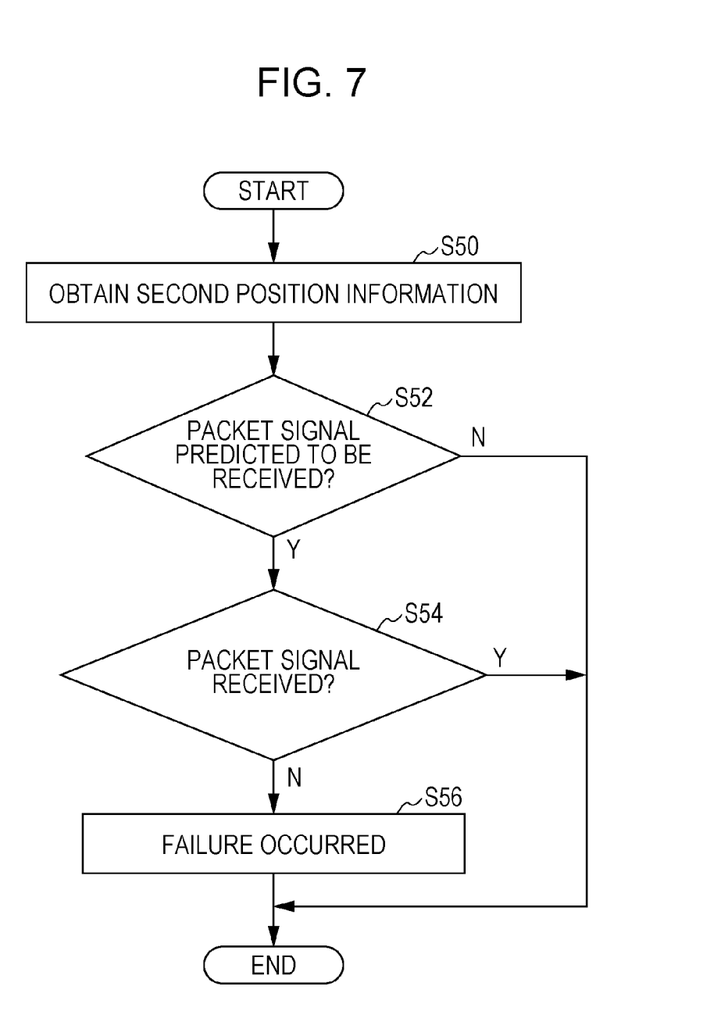
FIG. 7 is a flowchart illustrating a procedure for estimating occurrence of a reception failure performed by the terminal device of FIG. 3.

FIG. 7 is a flowchart illustrating a procedure for estimating occurrence of a failure performed by the terminal device 14. The acquisition unit 40 obtains the second position information (S50). If the prediction unit 44 predicts that a packet signal will be received from a base station device 10 (Y at S52) but the reception unit 30 does not receive a packet signal (N at S54), the estimation unit 46 estimates that a failure has occurred (S56). If the prediction unit 44 does not predict that a packet signal will be received (N at S52) or if the reception unit 30 receives a packet signal (Y at S54), the process ends.

According to the embodiment of the present disclosure, a reception failure is estimated to have occurred if a packet signal is not received when a packet signal is predicted to be received from a base station device based on the list of the first position information and on the second position information. Thus, occurrence of a failure in the reception functionality can be detected and also the necessity to receive a response signal can be eliminated. Eliminating the necessary to receive a response signal permits detection of occurrence of a failure in the reception functionality even in a case where broadcast transmission is performed. Furthermore, because reception of a packet signal is predicted based on the list of the first position information and on the second position information, prediction can be made without using the reception functionality. Making prediction without using the reception functionality also allows processing to be executed even when the reception functionality has a failure.

By prestoring the list of the first position information, a packet signal from a fixedly installed terminal device 14 can also be used for processing. In addition, since the list is generated based on the first position information that were included in previously received packet signals, the list can be organized with flexibility and advance preparation of the list is not necessary. In addition, situations where a fault of the reception functionality fails to be identified and the driver cannot appropriately receive driving assistance can be avoided.

One aspect of the present disclosure is generally as follows. A terminal device according to an aspect of the present disclosure includes: a receiver that receives a first packet signal including first position information indicating a position of a first radio device from the first radio device; a storage that stores a list containing the first position information; an acquirer that obtains second position information indicating the position of the terminal device; a determiner that determines whether it is possible for the receiver to receive a second packet signal from the first radio device based on the second position information and on the first position information contained in the list; and an estimator that estimates that a reception failure occurs in the receiver if the receiver fails to receive the second packet signal when the determiner determines that it is possible to receive the second packet signal.

According to this aspect, a failure is estimated to have occurred if a packet signal is not received when a packet signal is predicted to be received based on the list of the first position information and on the second position information. Thus, occurrence of a failure in the reception functionality can be detected.

The determiner may determine that it is possible for the receiver to receive the second packet signal from the first radio device when a distance between a position indicated by the first position information contained in the list and the position indicated by the second position information is shorter than a threshold. In this case, the prediction can be made without using the reception functionality because reception of a packet signal is predicted based on the first position information and the second position information.

The list may contain third position information for a known second radio device having a fixed position, the determiner may determine whether it is possible for the receiver to receive a third packet signal from the second radio device based on the second position information and the third position information, and the estimator may estimate that a reception failure occurs in the receiver if the receiver fails to receive the third packet signal when the determiner determines that it is possible to receive the third packet signal. In this case, processing can be simplified because the list is prestored.

The list may contain fourth position information that was included in a fourth packet signal previously received from a third radio device by the receiver, the determiner may determine whether it is possible for the receiver to receive a fourth packet signal from the third radio device based on the second position information and the fourth position information, and the estimator may estimate that a reception failure occurs in the receiver if the receiver fails to receive the fourth packet signal when the determiner determines that it is possible to receive the fourth packet signal. In this case, the list can be organized with flexibility because the list is generated based on the fourth position information that was included in previously received packet signals.

The present disclosure has been described with respect to the embodiment thereof. It will be appreciated by those skilled in the art that the embodiment is illustrative and different variations are possible for combination of the components or process steps and these variations fall within the scope of the present disclosure.

In the above embodiment, the storage unit 42 generates the list by registering the first position information included in a packet signal received by the reception unit 30 and belonging to the base station device 10 that sent the packet signal. However, the storage unit 42 may alternatively prestore a list of the first position information for fixed known radio devices, for example. Such known radio devices include vehicles 12 placed in automobile retailers or the like in addition to the base station device 10 described above. This variation would further simplify processing.

What is claimed is:

1. A terminal device comprising:
  a receiver circuit that receives a first packet signal including first position information indicating a position of a first radio device from the first radio device;
  a memory that stores a list containing the first position information; and
  processing circuitry that, in operation, performs operations including:
  obtaining second position information indicating the position of the terminal device;
  determining, prior to receiving a second packet signal, that it is possible for the receiver circuit to receive the second packet signal from the first radio device when a distance between a position indicated by the second position information and a position indicated by the first position information contained in the list is shorter than a threshold distance; and
  estimating that a reception malfunction is present in the receiver circuit if the receiver circuit fails to receive the second packet signal even though it was determined that it is possible to receive the second packet signal,
  wherein the list contains third position information for a known second radio device having a fixed position, and
  the processing circuitry further performs operations including: determining whether it is possible for the receiver circuit to receive third packet signal from the second radio device based on the second position information and the third position information, and
  estimating that a reception malfunction is present in the receiver circuit if the receiver circuit fails to receive the third packet signal even though it was determined that it is possible to receive the third packet signal.

2. The terminal device according to claim 1, wherein the list contains fourth position information that was included in a fourth packet signal previously received from a third radio device by the receiver circuit, and the processing circuitry further performs operations including:
  determining whether it is possible for the receiver circuit to receive a fourth packet signal from the third radio device based on the second position information and the fourth position information, and estimating that a reception malfunction is present in the receiver circuit if the receiver circuit fails to receive the fourth packet signal even though it was determined that it is possible to receive the fourth packet signal.

3. A method for use in a terminal device including a receiver, the method comprising:

receiving by the receiver a first packet signal including first position information indicating a position of a first radio device from the first radio device;

storing a list containing the first position information;

obtaining second position information indicating the position of the terminal device;

determining, prior to receiving a second packet signal, that it is possible for the receiver to receive the second packet signal from the first radio device when a distance between a position indicated by the second position information and a position indicated by the first position information contained in the list is shorter than a threshold distance; and estimating that a reception malfunction is present in the receiver if the receiver fans to receive the second packet signal even though it was determined that it is possible to receive the second packet signal, wherein the list contains third position information for a known second radio device having a fixed position, and further performing operations including: determining whether it is possible for the receiver to receive a third packet signal from the second radio device based on the second position information and the third position information, and estimating that a reception malfunction is present in the receiver if the receiver fails to receive the third packet signal even though it was determined that it is possible to receive the third packet signal.

4. A terminal device comprising:

at least one processor; and at least one memory including at least one set of instructions that, when executed by the at least one processor, cause the at least one processor to perform operations including:

receiving a first packet signal including first position information indicating a position of a first radio device from the first radio device;

storing a list containing the first position information;

obtaining second position information indicating the position of the terminal device;

determining, prior to receiving a second packet signal, that it is possible for the terminal device to receive the second packet signal when a distance between a position indicated by the first position information contained in the list and a position indicated by the second position information is shorter than a threshold distance; and estimating that a reception malfunction is present in the terminal device when the terminal device fails to receive a second packet signal from the first radio device even though it was determined that it is possible to receive the second packet signal, wherein the list contains third position information for a known second radio device having a fixed position, and further performing operations including: determining whether it is possible for the receiver circuit to receive a third packet signal from the second radio device based on the second position information and the third position information, and estimating that a reception malfunction is present in the receiver circuit if the receiver circuit fails to receive the third packet signal even though it was determined that it is possible to receive the third packet signal.

* * * * *